United States Patent
Watanabe

(10) Patent No.: US 12,013,412 B2
(45) Date of Patent: Jun. 18, 2024

(54) INERTIAL MEASUREMENT UNIT

(71) Applicant: SEIKO EPSON CORPORATION, Tokyo (JP)

(72) Inventor: Toru Watanabe, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/982,668

(22) Filed: Nov. 8, 2022

(65) Prior Publication Data
US 2023/0147973 A1    May 11, 2023

(30) Foreign Application Priority Data
Nov. 10, 2021  (JP) ................................. 2021-183112

(51) Int. Cl.
| | |
|---|---|
| *G01P 15/08* | (2006.01) |
| *G01C 19/5783* | (2012.01) |
| *G01P 1/02* | (2006.01) |
| *G01P 15/18* | (2013.01) |

(52) U.S. Cl.
CPC ...... *G01P 15/0802* (2013.01); *G01C 19/5783* (2013.01); *G01P 1/023* (2013.01); *G01P 15/18* (2013.01)

(58) Field of Classification Search
CPC ........ G01P 15/0802; G01P 15/18; G01P 1/02; G01P 1/023; G01P 1/026; G01C 19/5783
See application file for complete search history.

(56) References Cited

U.S. PATENT DOCUMENTS

| | | | | |
|---|---|---|---|---|
| 6,035,712 | A  * | 3/2000 | Ohta | G01P 1/023 |
| | | | | 73/493 |
| 6,448,624 | B1 * | 9/2002 | Ishio | G01P 1/006 |
| | | | | 438/50 |
| 2004/0238943 | A1 * | 12/2004 | Fujii | G01P 15/18 |
| | | | | 257/704 |
| 2009/0282917 | A1 * | 11/2009 | Acar | G01C 21/166 |
| | | | | 438/109 |
| 2014/0217566 | A1 * | 8/2014 | Goida | H01L 23/04 |
| | | | | 257/676 |
| 2017/0059605 | A1 | 3/2017 | Saito et al. | |
| 2017/0115116 | A1 * | 4/2017 | Ide | G01C 19/5642 |
| 2017/0191832 | A1 | 7/2017 | Kinoshita et al. | |
| 2017/0199217 | A1 * | 7/2017 | Naruse | G01P 15/0802 |
| 2019/0049483 | A1 * | 2/2019 | Matsuzawa | G01C 21/166 |
| 2019/0101562 | A1 * | 4/2019 | Kigure | G01P 15/125 |

(Continued)

FOREIGN PATENT DOCUMENTS

| | | |
|---|---|---|
| JP | 2017-049122 A | 3/2017 |
| JP | 2019-203904 A | 11/2019 |

*Primary Examiner* — Helen C Kwok
(74) *Attorney, Agent, or Firm* — Rankin, Hill & Clark LLP

(57) ABSTRACT

An inertial measurement unit includes: a substrate; a sealing member; a first inertial sensor module including a first inertial sensor and a first package accommodating the first inertial sensor; and a second inertial sensor module including a second inertial sensor and a second package accommodating the second inertial sensor. A material of the first package includes a resin. A material of the second package is an inorganic material. The first inertial sensor module is accommodated in a space between the substrate and the sealing member and thus airtightly sealed therein. The second inertial sensor module is provided outside the space.

11 Claims, 8 Drawing Sheets

(56) References Cited

U.S. PATENT DOCUMENTS

2019/0113324 A1\* 4/2019 Hwang ............. H01L 21/67259
2019/0162745 A1\* 5/2019 Otsuki .................... G01P 15/18
2020/0124633 A1\* 4/2020 Takeda ...................... G01P 1/02

\* cited by examiner

INERTIAL MEASUREMENT UNIT

The present application is based on, and claims priority from JP Application Serial Number 2021-183112, filed Nov. 10, 2021, the disclosure of which is hereby incorporated by reference herein in its entirety.

BACKGROUND

1. Technical Field

The present disclosure relates to an inertial measurement unit.

2. Related Art

An inertial measurement unit having an inertial sensor module having an inertial sensor such as an acceleration sensor or an angular velocity sensor is known. The inertial measurement unit is incorporated in various electronic devices or machines or is installed in a moving body such as a vehicle and is used to monitor an amount of inertia such as acceleration or angular velocity.

For example, JP-A-2017-49122 describes a sensor unit having a sensor device having an inertial sensor sealed with a sealing resin.

However, when moisture from outside enters the sealing resin as described above, the stress of the sealing resin may change. As the stress of the sealing resin changes, the inertial sensor is deformed, affecting the measurement by the sensor device.

SUMMARY

According to an aspect of the present disclosure, an inertial measurement unit includes: a substrate; a sealing member; a first inertial sensor module including a first inertial sensor and a first package accommodating the first inertial sensor; and a second inertial sensor module including a second inertial sensor and a second package accommodating the second inertial sensor. A material of the first package includes a resin. A material of the second package is an inorganic material. The first inertial sensor module is accommodated in a space between the substrate and the sealing member and thus airtightly sealed therein. The second inertial sensor module is provided outside the space.

DESCRIPTION OF EXEMPLARY EMBODIMENTS

A preferred embodiment of the present disclosure will now be described in detail, using the drawings. The embodiment described below should not unduly limit the content of the present disclosure described in the claims. Not all the configurations described below are necessarily essential configurations.

1. First Embodiment

1.1. Inertial Measurement Unit

Figure 1:
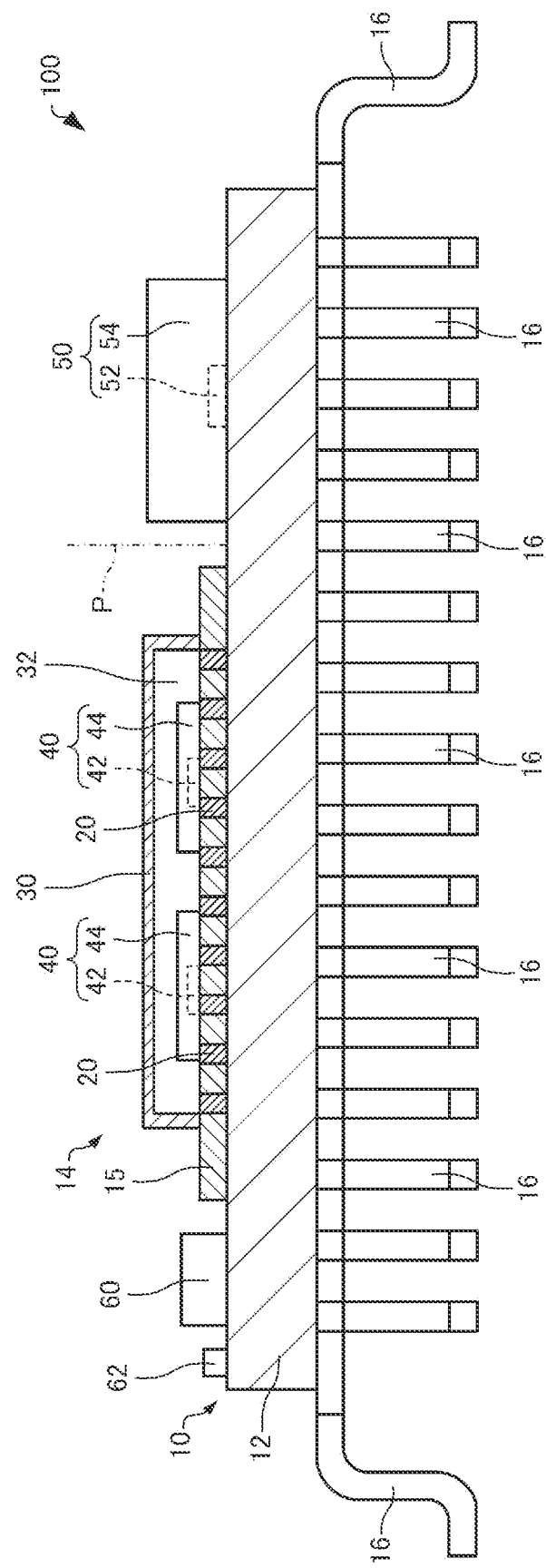
FIG. 1 schematically shows an inertial measurement unit according to a first embodiment.

First, an inertial measurement unit according to a first embodiment will be described with reference to the drawings. FIG. 1 schematically shows an inertial measurement unit 100 according to the first embodiment.

The inertial measurement unit 100 has, for example, a substrate 10, a terminal 16, a cap 30, a first inertial sensor module 40, a second inertial sensor module 50, a semiconductor element 60, and an electronic component 62, as shown in FIG. 1.

The substrate 10 has a first substrate 12 and a second substrate 14. The first substrate 12 is, for example, a ceramic substrate of aluminum oxide or the like. The first substrate 12 may be formed of a plurality of ceramic layers stacked on each other or may be formed of a single ceramic layer.

The second substrate 14 is provided on the first substrate 12. The second substrate 14 is provided between the first substrate 12 and the first inertial sensor module 40. The second substrate 14 is joined to the first substrate 12, for example, by a solder. As viewed from the direction of a perpendicular line P to the top surface of the first substrate 12, the area of the second substrate 14 is smaller than the area of the first substrate 12. The second substrate 14 has a plate-like member 15. The plate-like member 15 is, for example, a ceramic substrate of aluminum oxide or the like. The plate-like member 15 may be formed of a plurality of ceramic layers stacked on each other or may be formed of a single ceramic layer. The second substrate 14 may have a recess. In this case, The second substrate 14 may be formed of a plurality of ceramic layers stacked on each other.

The terminal 16 is provided under the first substrate 12. The terminal 16 protrudes from the first substrate 12. The terminal 16 is provided in a plural number. The number of terminals 16 is not particularly limited. The material of the terminal 16 is, for example, a metal such as copper, aluminum, or gold. The inertial measurement unit 100 can be installed at an external member, not illustrated, via the terminal 16.

The second substrate 14 has a terminal electrode 20. The terminal electrode 20 penetrates the plate-like member 15 in the direction of the perpendicular line P. Specifically, a penetration hole is provided in the plate-like member 15 and the terminal electrode 20 is provided in the penetration hole. The terminal electrode 20 is provided in a plural number. The number of terminal electrodes 20 is not particularly limited. The material of the terminal electrode 20 is, for example, a metal such as silver, silver-palladium, platinum-silver, or copper.

The cap 30 is a sealing member described in the claims. The cap 30 is provided on the substrate 10. In the illustrated example, the cap 30 is provided on the second substrate 14. The cap 30 is joined to the second substrate 14, for example, by a solder. The cap 30 is in the shape of a downwardly open case. The material of the cap 30 is, for example, a metal such as aluminum or stainless steel. The cap 30 is formed, for example, by press-molding a metal material. When the second substrate 14 has a recess, the cap 30 may be a flat plate. That is, the cap 30 may not have a recess.

The cap 30 together with the substrate 10 airtightly seals the first inertial sensor module 40. In the illustrated example, the first inertial sensor module 40 is accommodated in a space 32 between the substrate 10 and the cap 30. Specifically, the space 32 surrounded by the second substrate 14 and the cap 30 is airtightly sealed and the first inertial sensor module 40 is located in the space 32. The cap 30 seals the first inertial sensor module 40 in the state where the airtightness of the space 32 is maintained.

The first inertial sensor module 40 is provided on the substrate 10. In the illustrated example, the first inertial sensor module 40 is provided on the second substrate 14. The first inertial sensor module 40 is joined to the second substrate 14, for example, by a solder. The first inertial sensor module 40 is located inside the cap 30.

The first inertial sensor module 40 has a first inertial sensor 42. The first inertial sensor 42 may be an acceleration sensor detecting an acceleration or a gyro sensor detecting an angular velocity. The first inertial sensor module 40 may be a 6 DoF (six-degrees of freedom) sensor. In this case, the first inertial sensor module 40 has a plurality of inertial sensors, not illustrated, in addition to the first inertial sensor 42. Thus, the first inertial sensor module 40 can detect accelerations and angular velocities about three axes orthogonal to each other as detection axes. The first inertial sensor 42 is, for example, a silicon MEMS (micro-electromechanical systems) device.

The first inertial sensor module 40 has a first package 44. The first package 44 accommodates the first inertial sensor 42. The first package 44 molds the outer shape of the first inertial sensor module 40. The material of the first package 44 includes a resin. Specifically, the material of the outside of the first package 44 is an epoxy resin. The inside of the resin of the first package 44 may be an inorganic material such as glass or silicon.

For example, two first inertial sensor modules 40 are provided. Averaging detection values detected by the two first inertial sensor modules 40 can make the detection accuracy of the inertial measurement unit 100 higher than when only one first inertial sensor module 40 is provided. The number of first inertial sensor modules 40 is not particularly limited and may be one, or three or more.

The second inertial sensor module 50 is provided on the substrate 10. In the illustrated example, the second inertial sensor module 50 is provided on the first substrate 12. The second inertial sensor module 50 is joined to the first substrate 12, for example, by a solder. The second inertial sensor module 50 is located outside the cap 30. The second inertial sensor module 50 is spaced apart from the second substrate 14.

The second inertial sensor module 50 has a second inertial sensor 52. The detection accuracy of the second inertial sensor 52 is, for example, higher than the detection accuracy of the first inertial sensor 42. The second inertial sensor 52 is, for example, a quartz crystal gyro sensor. The second inertial sensor 52 may be an acceleration sensor. The second inertial sensor module 50 may also have a plurality of inertial sensors, not illustrated, in addition to the second inertial sensor 52.

The second inertial sensor module 50 has a second package 54. The second package 54 accommodates the second inertial sensor 52. The second package 54 molds the outer shape of the second inertial sensor module 50. The material of the outside of the second package 54 is not a resin. The material of the second package 54 is an inorganic material, which is less likely to be permeated by moisture than a resin. The material of the second package 54 is, for example, a ceramic or a metal.

The semiconductor element 60 is provided on the substrate 10. In the illustrated example, the semiconductor element 60 is provided on the first substrate 12. The semiconductor element 60 is joined to the first substrate 12, for example, by a solder. The semiconductor element 60 is located outside the cap 30. The semiconductor element 60 is spaced apart from the second substrate 14. The semiconductor element 60 is formed, including an IC (integrated circuit).

The semiconductor element 60 drives the first inertial sensor 42. The semiconductor element 60 is electrically coupled to the first inertial sensor 42, for example, via a wiring, not illustrated, that is provided on the first substrate 12, and via the terminal electrode 20. The semiconductor element 60 is electrically coupled to the terminal 16, for example, through a via hole, not illustrated, that penetrates the first substrate 12. The semiconductor element 60 also drives the second inertial sensor 52. The semiconductor element 60 is electrically coupled to the second inertial sensor 52, for example, via a wiring, not illustrated, that is provided on the first substrate 12.

The semiconductor element 60 may be not electrically coupled to the second inertial sensor 52. In this case, the inertial measurement unit 100 includes a semiconductor element, not illustrated, that is electrically coupled to the second inertial sensor 52.

The electronic component 62 is provided on the substrate 10. In the illustrated example, the electronic component 62 is provided on the first substrate 12. The electronic component 62 is joined to the first substrate 12, for example, by a solder. The electronic component 62 is located outside the cap 30. The number of electronic components 62 is not particularly limited. The electronic component 62 is electrically coupled to the terminal 16, for example, through a via hole, not illustrated, that penetrates the first substrate 12. The electronic component 62 is electrically coupled to the first inertial sensor 42, for example, via a wiring, not illustrated, that is provided on the first substrate 12. The electronic component 62 is, for example, a capacitor or the like.

1.2. Method for Producing Inertial Measurement Unit

Figure 2:
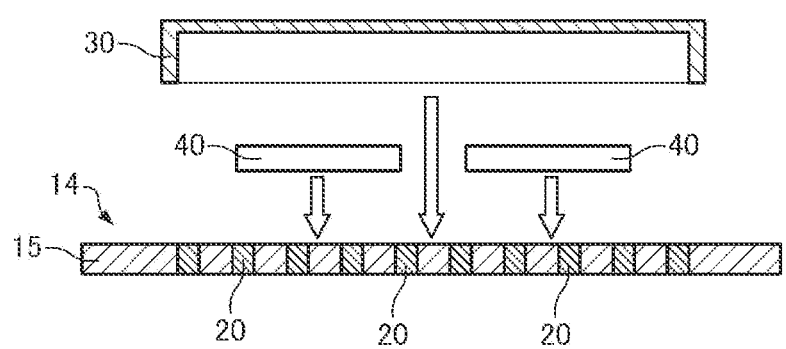
FIG. 2 schematically shows a production process for the inertial measurement unit according to the first embodiment.
Figure 3:
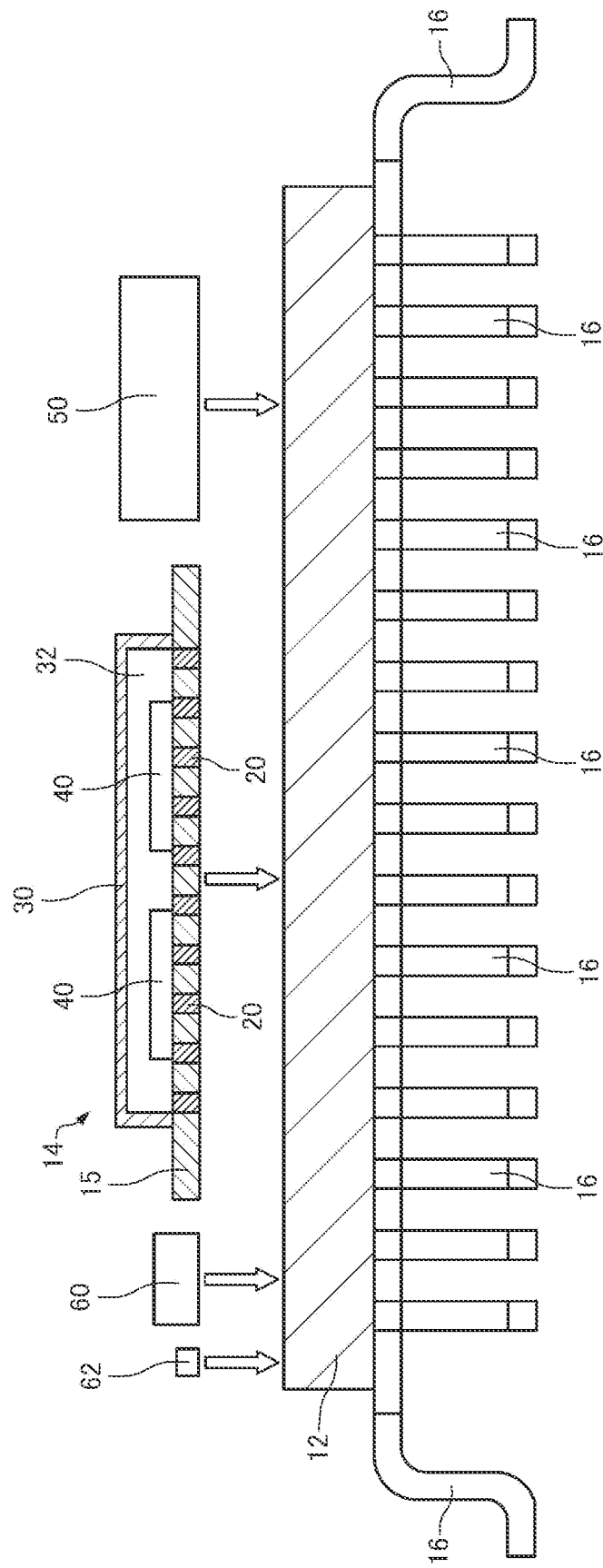
FIG. 3 schematically shows the production process for the inertial measurement unit according to the first embodiment.

A method for producing the inertial measurement unit 100 according to the first embodiment will now be described with reference to the drawings. FIGS. 2 and 3 schematically show a production process for the inertial measurement unit 100 according to the first embodiment.

As shown in FIG. 2, the second substrate 14 provided with the terminal electrode 20, the cap 30, and the first inertial sensor module 40 are prepared. Next, the first inertial sensor module 40 is joined to the second substrate 14. Next, the cap 30 is joined to the second substrate 14, thus airtightly sealing the first inertial sensor module 40.

As shown in FIG. 3, the first substrate 12 provided with the terminal 16, the second inertial sensor module 50, the semiconductor element 60, and the electronic component 62 are prepared. Next, the second substrate 14 provided with the cap 30 and the first inertial sensor module 40, the second inertial sensor module 50, the semiconductor element 60, and the electronic component 62 are jointed to the first substrate 12. The order of joining the second substrate 14, the second inertial sensor module 50, the semiconductor element 60, and the electronic component 62 is not particularly limited.

This process can produce the inertial measurement unit 100 as shown in FIG. 1.

1.3. Advantageous Effects

In the inertial measurement unit 100, the first inertial sensor module 40 is accommodated in the space 32 between the substrate 10 and the cap 30 (sealing member) and thus airtightly sealed therein. The second inertial sensor module 50 is provided outside the space 32 between the substrate 10 and the cap 30 (sealing member).

Therefore, in the inertial measurement unit 100, the probability of moisture entering the first package 44 whose material includes a resin can be made lower than when the first inertial sensor module is not airtightly sealed. Thus, in the inertial measurement unit 100, the deformation of the first inertial sensor 42 due to the change in the stress of the first package 44 caused by the entry of moisture into the first package 44 can be restrained. Therefore, the first inertial sensor 42 can have good properties.

Also, in the inertial measurement unit 100, the size of the cap 30 can be made smaller than when the second inertial sensor module is provided inside the cap. Thus, a reduction in cost can be achieved in the inertial measurement unit 100.

In the inertial measurement unit 100, the substrate 10 has the first substrate 12, and the second substrate 14 arranged between the first inertial sensor module 40 and the first substrate 12. The first inertial sensor module 40 is accommodated in the space 32 between the second substrate 14 and the cap 30 (sealing member). The second inertial sensor module 50 is provided on the first substrate 12 and spaced apart from the second substrate 14. Therefore, in the inertial measurement unit 100, the second substrate 14 and the cap 30 together can easily airtightly seal the first inertial sensor module 40. For example, when the second substrate is not provided and the first substrate and the cap together airtightly seal the first inertial sensor module, a wiring, not illustrated, that is electrically coupled to the first inertial sensor needs to be laid between the first substrate and the cap, making the airtight sealing difficult. Also, in the inertial measurement unit 100, the size of the second substrate 14 can be made smaller than when the second inertial sensor module is provided at the second substrate. Thus, a reduction in cost can be achieved.

The inertial measurement unit 100 has the semiconductor element 60 driving the first inertial sensor 42. The second substrate 14 has the plate-like member 15 and the terminal electrode 20 penetrating the plate-like member 15. The semiconductor element 60 is electrically coupled to the first inertial sensor 42 via the terminal electrode 20. Therefore, in the inertial measurement unit 100, the semiconductor element 60 and the first inertial sensor 42 can be electrically coupled together while the first inertial sensor module 40 is airtightly sealed.

In the inertial measurement unit 100, the material of the second package 54 is a ceramic. Therefore, in the inertial measurement unit 100, the entry of moisture into the second inertial sensor 52 can be restrained.

In the inertial measurement unit 100, the first inertial sensor module 40 uses three axes orthogonal to each other as detection axes. Therefore, the inertial measurement unit 100 can detect an amount of inertia, using the three axes orthogonal to each other as the detection axes.

In the inertial measurement unit 100, the first inertial sensor module 40 detects an acceleration and an angular velocity. Therefore, the inertial measurement unit 100 can detect an acceleration and an angular velocity, using the three axes orthogonal to each other as the detection axes.

In the inertial measurement unit 100, the detection accuracy of the second inertial sensor 52 is higher than the detection accuracy of the first inertial sensor 42. Therefore, the inertial measurement unit 100 can detect an amount of inertia with high accuracy by the second inertial sensor 52.

1.4. Modification Example

Figure 4:
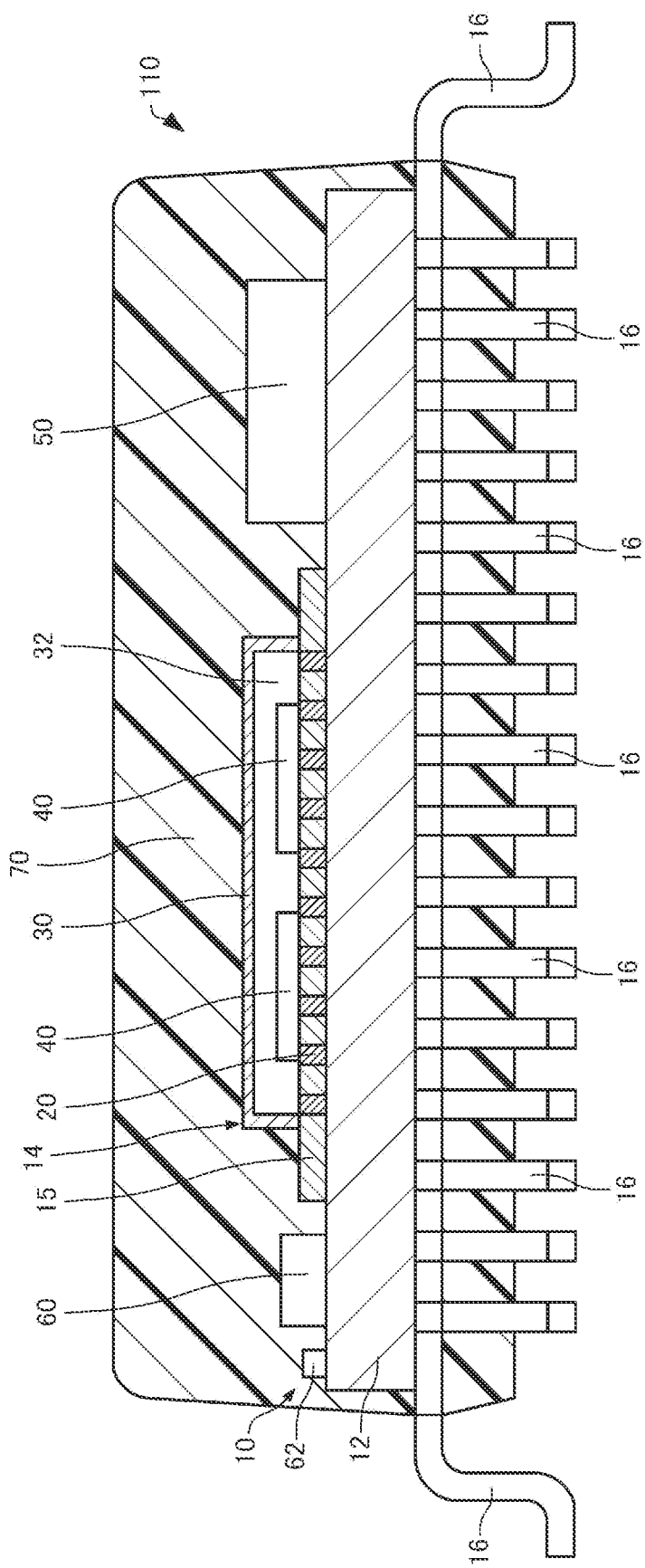
FIG. 4 schematically shows an inertial measurement unit according to a modification example of the first embodiment.

An inertial measurement unit according to a modification example of the first embodiment will now be described with reference to the drawings. FIG. 4 schematically shows an inertial measurement unit 110 according to a modification example of the first embodiment. In the following description of the inertial measurement unit 110 according to the modification example of the first embodiment, components having functions similar to those of components of the inertial measurement unit 100 are denoted by the same reference signs and are not described further in detail.

The inertial measurement unit 110 differs from the inertial measurement unit 100 in having a mold resin 70, as shown in FIG. 4.

The mold resin 70 covers the first substrate 12, the second substrate 14, the cap 30, the second inertial sensor module 50, the semiconductor element 60, and the electronic component 62. In the illustrated example, the mold resin 70 covers the side surface and the bottom surface of the first substrate 12. The terminal 16 protrudes from the mold resin 70. The material of the mold resin 70 is, for example, an epoxy resin. The mold resin 70 is formed, for example, by a method such as spin coating or CVD (chemical vapor deposition).

The inertial measurement unit 110 has the mold resin 70 covering the cap 30 and the second inertial sensor module 50. Therefore, in the inertial measurement unit 110, an external impact on the cap 30 and the second inertial sensor module 50 can be reduced. Thus, the breakage or falling-off of the cap 30 and the second inertial sensor module 50 can be restrained. The external impact may be contact with an external member, not illustrated, or the like.

2. Second Embodiment

2.1. Inertial Measurement Unit

Figure 5:
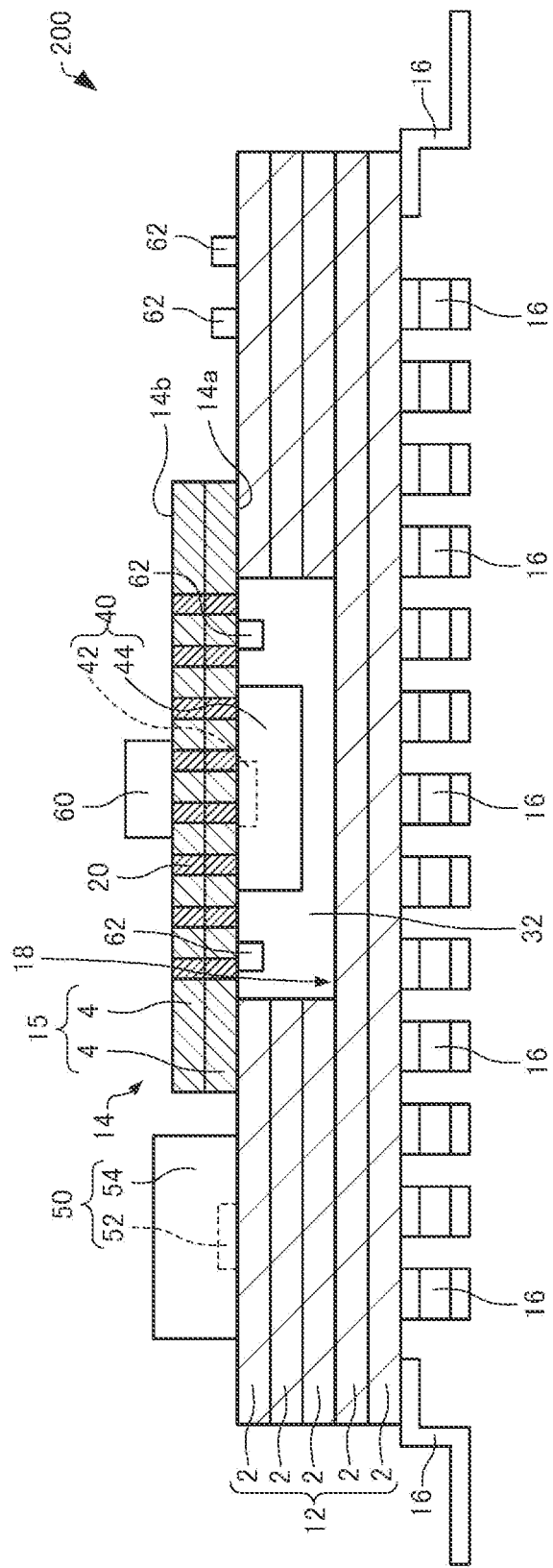
FIG. 5 schematically shows an inertial measurement unit according to a second embodiment.

An inertial measurement unit according to a second embodiment will now be described with reference to the drawings. FIG. 5 schematically shows an inertial measurement unit 200 according to the second embodiment. In the following description of the inertial measurement unit 200 according to the second embodiment, components having functions similar to those of components of the inertial measurement units 100, 110 are denoted by the same reference signs and are not described further in detail.

In the inertial measurement unit 100, the second substrate 14 and the cap 30 airtightly seal the first inertial sensor module 40, as shown in FIG. 1.

In contrast, in the inertial measurement unit 200, the cap 30 is not provided and the first inertial sensor module 40 is accommodated in the space 32 between a recess 18 on the substrate 12 and a third substrate 14 and thus airtightly sealed therein, as shown in FIG. 5. The third substrate 14 is a sealing member in the claims.

The recess 18 is provided on the substrate 12. The recess 18 is provided at the top surface of the substrate 12. In the illustrated example, the substrate 12 is formed of five ceramic layers 2. A part of the third, fourth, and the fifth ceramic layers 2 from the bottom, of the five ceramic layers 2, are eliminated to form the recess 18. The ceramic layer 2 is, for example, an aluminum oxide layer. The number of ceramic layers 2 is not particularly limited.

The third substrate 14 closes the recess 18. The space 32, where the recess 18 is provided, is airtightly sealed by the substrate 12 and the third substrate 14. The third substrate 14 has a first surface 14a and a second surface 14b facing the opposite directions. The third substrate 14 is joined to the substrate 12, with the first surface 14a facing the substrate 12. In the illustrated example, the third substrate 14 is formed of three ceramic layers 4. The ceramic layer 4 is, for example, an aluminum oxide layer. The number of ceramic layers 4 is not particularly limited.

The first inertial sensor module 40 is provided on the first surface 14a of the third substrate 14. In the illustrated example, only one first inertial sensor module 40 is provided. The first inertial sensor module 40 is located in the space 32. In the illustrated example, four electronic components 62 are provided. Two electronic components 62, of the four electronic components 62, are provided on the first surface 14a of the third substrate 14 and located in the space 32. The other two electronic components 62 are provided on the substrate 12 and not located in the space 32.

The semiconductor element 60 is provided on the second surface 14b of the third substrate 14. The semiconductor element 60 is not located in the recess 18. Although not illustrated, the semiconductor element 60 may be provided on the substrate 12.

2.2. Method for Producing Inertial Measurement Unit

Figure 6:
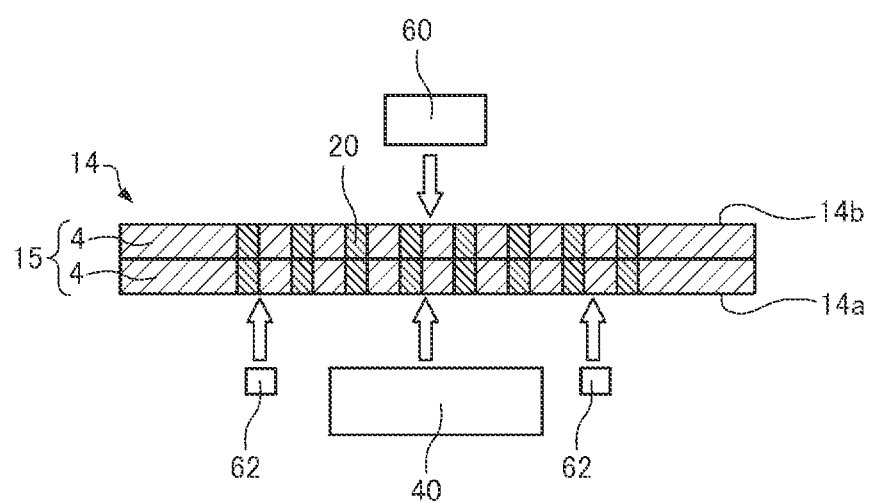
FIG. 6 schematically shows a production process for the inertial measurement unit according to the second embodiment.
Figure 7:
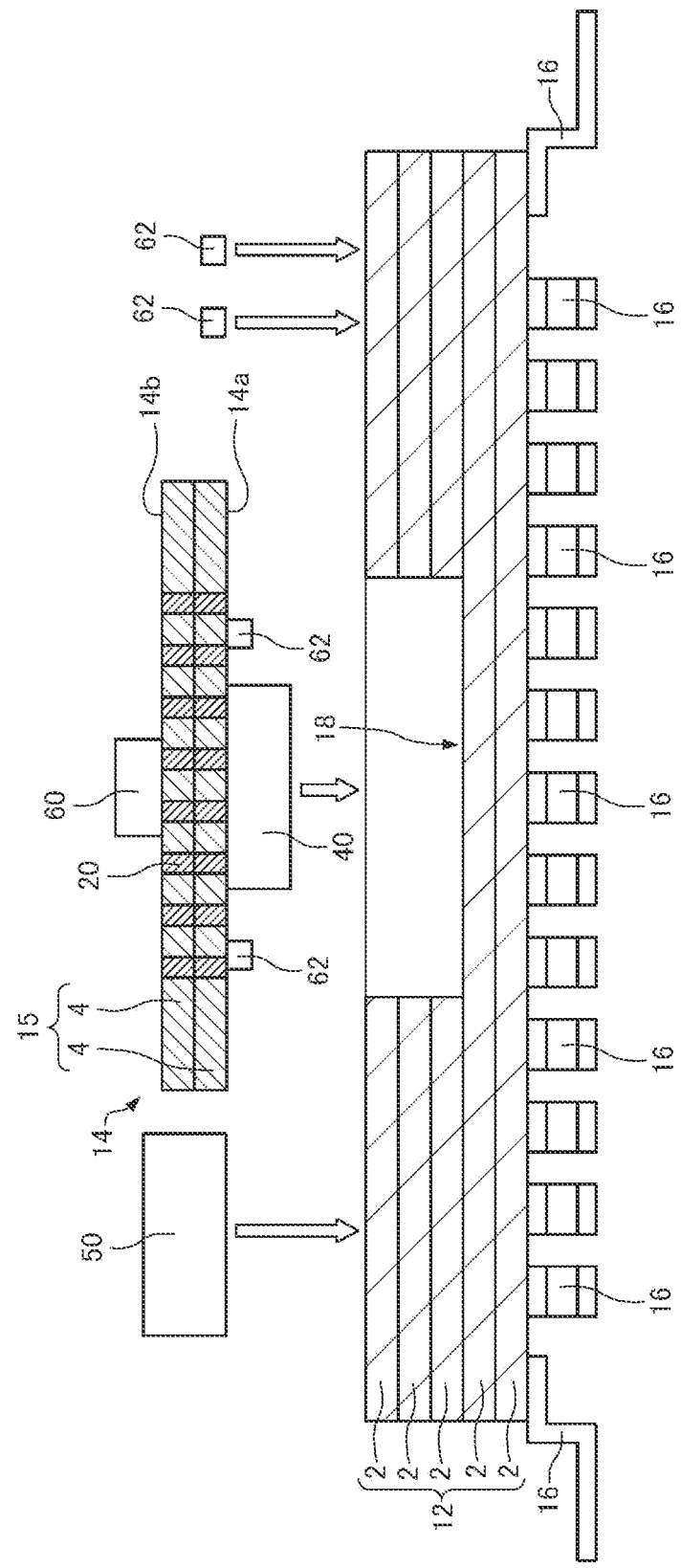
FIG. 7 schematically shows the production process for the inertial measurement unit according to the second embodiment.

A method for producing the inertial measurement unit 200 according to the second embodiment will now be described with reference to the drawings. FIGS. 6 and 7 schematically show a production process for the inertial measurement unit 200 according to the second embodiment.

As shown in FIG. 6, the third substrate 14 provided with the terminal electrode 20, the first inertial sensor module 40, and the electronic component 62 are prepared. Next, the first inertial sensor module 40 and the electronic component 62 are joined to the first surface 14a of the third substrate 14. Next, the semiconductor element 60 is joined to the second surface 14b of the third substrate 14. The order of joining the second inertial sensor module 50, the semiconductor element 60, and the electronic component 62 is not particularly limited.

As shown in FIG. 7, the first substrate 12 provided with the recess 18, the second inertial sensor module 50, the semiconductor element 60, and the electronic component 62 are prepared. Next, the third substrate 14 provided with the first inertial sensor module 40 and the electronic component 62, the second inertial sensor module 50, the semiconductor element 60, and the electronic component 62 are jointed to the substrate 12. The third substrate 14 is joined to the substrate 12, with the first surface 14a facing the substrate 12, thus airtightly sealing the recess 18. The order of joining the third substrate 14, the second inertial sensor module 50, the semiconductor element 60, and the electronic component 62 is not particularly limited.

This process can produce the inertial measurement unit 200 as shown in FIG. 5.

2.3. Advantageous Effects

In the inertial measurement unit 200, the first inertial sensor module 40 is accommodated in the space 32 between the recess 18 in the substrate 12 and the third substrate 14 and thus airtightly sealed therein.

Therefore, in the inertial measurement unit 200, as in the inertial measurement unit 100, the probability of moisture entering the first package 44 whose material includes a resin can be reduced. Also, in the inertial measurement unit 200, the size of the third substrate 14 can be made smaller than when the second inertial sensor module is provided in the space between the recess in the substrate and the third substrate. Thus, a reduction in cost can be achieved in the inertial measurement unit 200.

2.4. Modification Example

Figure 8:
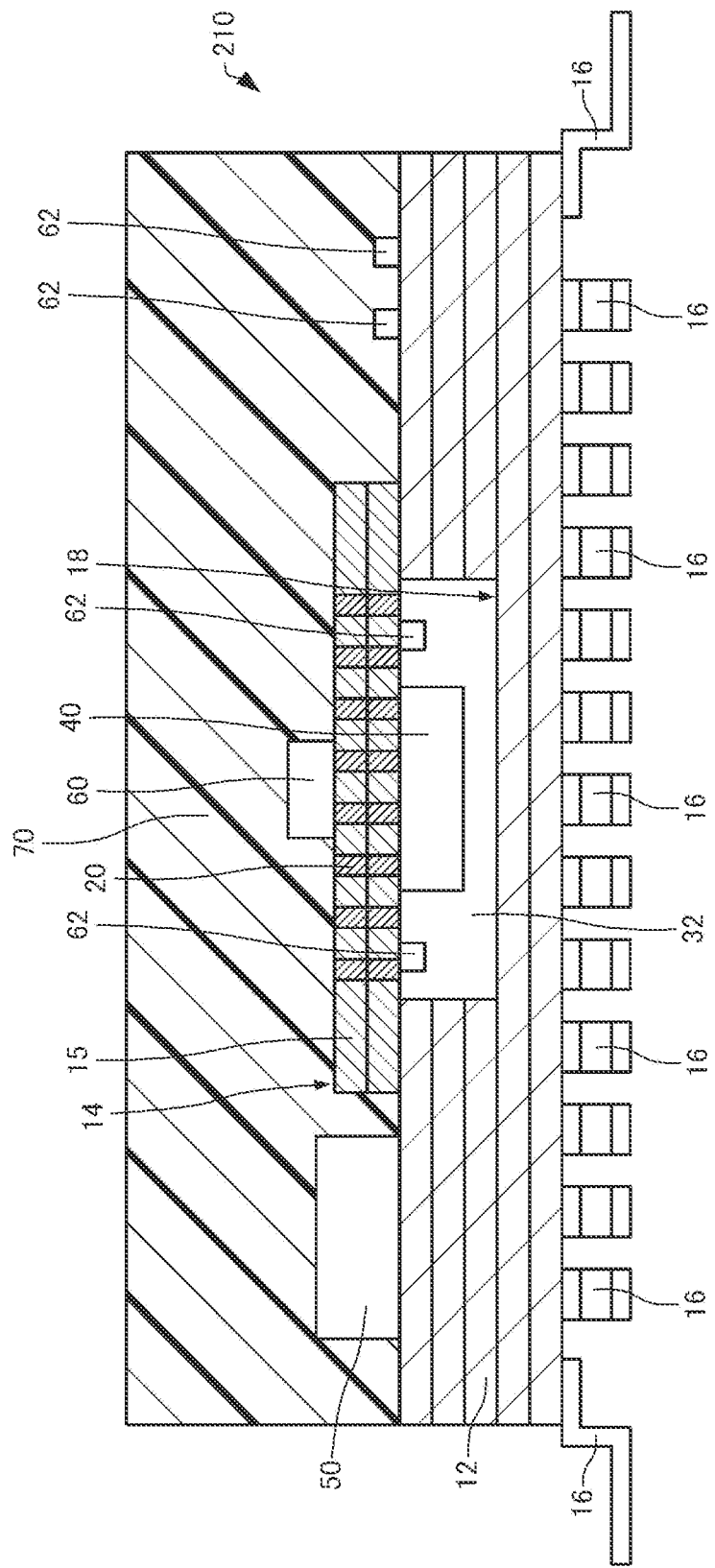
FIG. 8 schematically shows an inertial measurement unit according to a modification example of the second embodiment.

An inertial measurement unit according to a modification example of the second embodiment will now be described with reference to the drawings. FIG. 8 schematically shows an inertial measurement unit 210 according to a modification example of the second embodiment. In the following description of the inertial measurement unit 210 according to the modification example of the second embodiment, components having functions similar to those of components of the inertial measurement units 100, 110, 200 are denoted by the same reference signs and are not described further in detail.

The inertial measurement unit 210 differs from the inertial measurement unit 200 in having the mold resin 70, as shown in FIG. 8.

In the inertial measurement unit 210, the mold resin 70 covers the substrate 12, the third substrate 14, the terminal electrode 20, the second inertial sensor module 50, the semiconductor element 60, and the electronic component 62.

The inertial measurement unit 210 has the mold resin 70 covering the substrate 12, the third substrate 14, and the second inertial sensor module 50, as described above. Therefore, in the inertial measurement unit 210, an external impact on the substrate 12, the third substrate 14, and the second inertial sensor module 50 can be reduced, as in the inertial measurement unit 110.

The above embodiments and modification examples are simply examples. The present disclosure is not limited to these embodiments and modification examples. For example, the embodiments and the modification examples can be suitably combined together where appropriate.

The present disclosure includes a configuration that is substantially the same as any of the configurations described in the embodiments, for example, a configuration having the same function, method, and result, or a configuration having the same object and effect. The present disclosure also includes a configuration formed by replacing a non-essential part of any of the configurations described in the embodiments. The present disclosure also includes a configuration having the same advantageous effect as any of the configurations described in the embodiments or a configuration that can achieve the same object. The present disclosure also includes a configuration formed by adding a known technique to any of the configurations described in the embodiments.

The following contents are derived from the above embodiments and modification examples.

According to an aspect, the inertial measurement unit includes: a substrate; a sealing member; a first inertial sensor module including a first inertial sensor and a first package accommodating the first inertial sensor; and a second inertial sensor module including a second inertial sensor and a second package accommodating the second inertial sensor. A material of the first package includes a resin. A material of the second package is an inorganic material. The first inertial sensor module is accommodated in a space between the substrate and the sealing member and thus airtightly sealed therein. The second inertial sensor module is provided outside the space.

According to another aspect, the inertial measurement unit includes: a substrate; a sealing member; a first inertial sensor module including a first inertial sensor and a first package accommodating the first inertial sensor; and a second inertial sensor module including a second inertial sensor and a second package accommodating the second inertial sensor. A material of the first package includes a resin. A material of the second package is not a resin. The first inertial sensor module is accommodated in a space between the substrate and the sealing member and thus airtightly sealed therein. The second inertial sensor module is provided outside the space between the substrate and the sealing member.

In this inertial measurement unit, the probability of moisture entering the first package whose material includes a resin can be reduced.

According to another aspect, in the inertial measurement unit, the substrate may have a first substrate, and a second substrate arranged between the first inertial sensor module and the first substrate. The sealing member may be a cap. The first inertial sensor module may be accommodated in the space between the second substrate and the cap. The second inertial sensor module may be provided at the first substrate and spaced apart from the second substrate.

In this inertial measurement unit, the second substrate and the sealing member together can easily airtightly seal the first inertial sensor module.

According to another aspect, the inertial measurement unit may have a mold resin covering the cap and the second inertial sensor module.

In this inertial measurement unit, an external impact on the cap and the second inertial sensor module can be reduced.

According to another aspect, the inertial measurement unit may have a semiconductor element driving the first inertial sensor. The second substrate may have a plate-like member, and a terminal electrode penetrating the plate-like member. The semiconductor element may be electrically coupled to the first inertial sensor via the terminal electrode.

In this inertial measurement unit, the semiconductor element and the first inertial sensor can be electrically coupled together while the first inertial sensor module is airtightly sealed.

According to another aspect, in the inertial measurement unit, the substrate may be provided with a recess. The sealing member may be a third substrate. The first inertial sensor module may be accommodated in the space between the recess in the substrate and the third substrate and thus airtightly sealed therein.

In this inertial measurement unit, the probability of moisture entering the first package whose material includes a resin can be reduced.

According to another aspect, the inertial measurement unit may have a mold resin covering the substrate, the third substrate, and the second inertial sensor module.

In this inertial measurement unit, an external impact on the substrate, the third substrate, and the second inertial sensor module can be reduced.

According to another aspect, the inertial measurement unit may have a semiconductor element driving the first inertial sensor. The third substrate may have a plate-like member, and a terminal electrode penetrating the plate-like member. The semiconductor element may be electrically coupled to the first inertial sensor via the terminal electrode.

In this inertial measurement unit, the semiconductor element and the first inertial sensor can be electrically coupled together while the first inertial sensor module is airtightly sealed.

According to another aspect, in the inertial measurement unit, the material of the second package may be a ceramic.

In this inertial measurement unit, the entry of moisture into the second inertial sensor can be restrained.

According to another aspect, in the inertial measurement unit, the first inertial sensor module may use three axes orthogonal to each other as detection axes.

In this inertial measurement unit, an amount of inertia can be detected using the three axes orthogonal to each other as the detection axes.

According to another aspect, in the inertial measurement unit, the first inertial sensor module may detect an acceleration and an angular velocity.

In this inertial measurement unit, an acceleration and an angular velocity can be detected using the three axes orthogonal to each other as the detection axes.

According to another aspect, in the inertial measurement unit, a detection accuracy of the second inertial sensor may be higher than a detection accuracy of the first inertial sensor.

In this inertial measurement unit, an amount of inertia can be detected with high accuracy by the second inertial sensor.

What is claimed is:

1. An inertial measurement unit comprising:
   a substrate;
   a sealing member;
   a first inertial sensor module including a first inertial sensor and a first package accommodating the first inertial sensor; and
   a second inertial sensor module including a second inertial sensor and a second package accommodating the second inertial sensor, wherein
   a material of the first package includes a resin,
   a material of the second package is an inorganic material,
   the first inertial sensor module is accommodated in a space between the substrate and the sealing member and thus airtightly sealed therein, and
   the second inertial sensor module is provided outside the space.

2. The inertial measurement unit according to claim 1, wherein
   the substrate has a first substrate, and a second substrate provided on a first surface of the first substrate, the second substrate arranged between the first inertial sensor module and the first substrate,
   the sealing member is a cap, the first inertial sensor module is provided on the second substrate and is accommodated in the space between the second substrate and the cap, and the second inertial sensor module is provided on the first surface of the first substrate and spaced apart from the second substrate.

3. The inertial measurement unit according to claim 2, further comprising:

a mold resin directly covering the cap and the second inertial sensor module.

4. The inertial measurement unit according to claim 2, further comprising:

a semiconductor element driving the first inertial sensor, wherein the second substrate has a plate-like member, and a terminal electrode penetrating the plate-like member, and the semiconductor element is electrically coupled to the first inertial sensor via the terminal electrode.

5. The inertial measurement unit according to claim 1, wherein the substrate is provided with a recess, the sealing member is a second substrate, and the first inertial sensor module is accommodated in the space between the recess in the substrate and the third substrate and thus airtightly sealed therein.

6. The inertial measurement unit according to claim 5, further comprising:

a mold resin covering the substrate, the second substrate, and the second inertial sensor module.

7. The inertial measurement unit according to claim 5, further comprising:

a semiconductor element driving the first inertial sensor, wherein the second substrate has a plate-like member, and a terminal electrode penetrating the plate-like member, and the semiconductor element is electrically coupled to the first inertial sensor via the terminal electrode.

8. The inertial measurement unit according to claim 1, wherein the material of the second package is a ceramic.

9. The inertial measurement unit according to claim 1, wherein the first inertial sensor module uses three axes orthogonal to each other as detection axes.

10. The inertial measurement unit according to claim 9, wherein the first inertial sensor module detects an acceleration and an angular velocity.

11. The inertial measurement unit according to claim 1, wherein a detection accuracy of the second inertial sensor is higher than a detection accuracy of the first inertial sensor.

* * * * *